H. G. CARLSON.
METHOD OF MAKING HANDLES AND THE LIKE.
APPLICATION FILED NOV. 22, 1919.
1,397,360.
Patented Nov. 15, 1921.
3 SHEETS—SHEET 1.
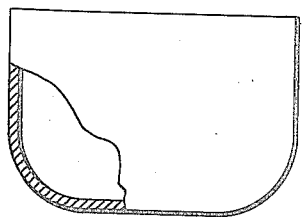
Fig. 1.
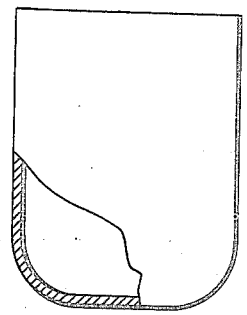
Fig. 2.
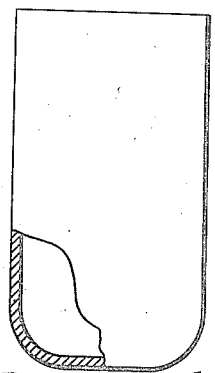
Fig. 3.
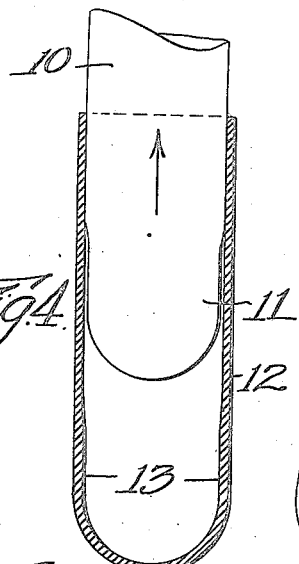
Fig. 4.
Fig. 6.
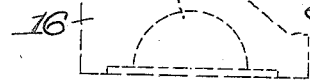
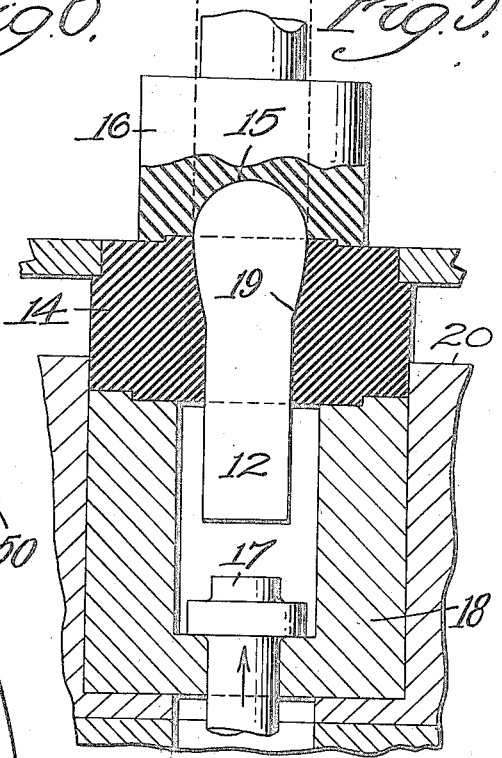
Fig. 5.
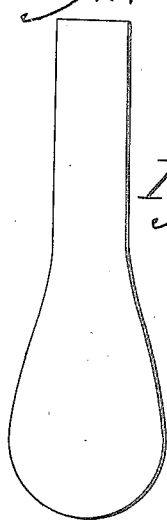
Fig. 8.
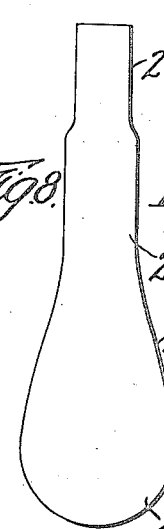
Fig. 9.
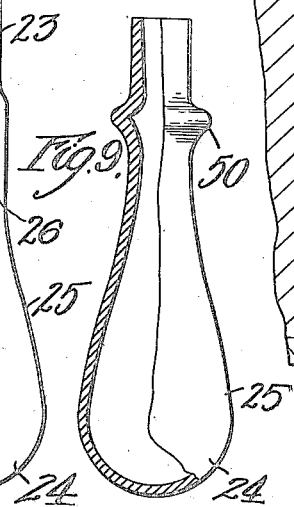
Inventor:
H. G. Carlson.
By attorneys
Southgate & Southgate.

H. G. CARLSON.
METHOD OF MAKING HANDLES AND THE LIKE.
APPLICATION FILED NOV. 22, 1919.

1,397,360.

Patented Nov. 15, 1921.
3 SHEETS—SHEET 2.

H. G. CARLSON.
METHOD OF MAKING HANDLES AND THE LIKE.
APPLICATION FILED NOV. 22, 1919.

1,397,360.

Patented Nov. 15, 1921.
3 SHEETS—SHEET 3.

Witness
C. F. Nixon

Inventor
H. G. Carlson.
By Attorneys
Southgate & Southgate

UNITED STATES PATENT OFFICE.

HJALMAR G. CARLSON, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS.

METHOD OF MAKING HANDLES AND THE LIKE.

1,397,360.        Specification of Letters Patent.        Patented Nov. 15, 1921.

Application filed November 22, 1919. Serial No. 339,990.

*To all whom it may concern:*

Be it known that I, HJALMAR G. CARLSON, a citizen of the United States, residing at Worcester, in the county of Worcester and State of Massachusetts, have invented a new and useful Method of Making Handles and the like, of which the following is a specification.

This invention relates to a method of making from sheet metal, handles which are usually used for hand wheels, cranks and the like, and other articles of similar shape. By similar shape, I mean a general pear-shape, that is, ovate or hemispherical at the closed end merging into a conical shaped body and having a smaller end for attachment to the article to which it is to be applied, and preferably having a rib surrounding it near the small end.

Such articles have been made heretofore of solid metal and have been heavy and expensive. By making them of sheet metal, they are much lighter, which has numerous advantages in machine construction other than the mere saving of material, and I find that when made by the method herein described, they are comparatively inexpensive to manufacture as the machining processes through which the solid metal articles have to pass are eliminated.

In accordance with my method, I draw the article by a successive series of steps from a blank of sheet metal. After I have reduced it to a general cylindrical shape with one end closed and the other end open, I prepare the closed end for resisting the severe pressure to which it is to be subjected in drawing down the open end. This I do by thickening up said closed end by a drawing operation. After this is accomplished, the open end is drawn down in dies so as to get the general shape of the article to be produced and then the open end is upset to produce a circumferential rib and thicken the metal at that point.

Reference is to be had to the accompanying drawings, in which—

Figures 1, 2 and 3 are side views partly in section, showing three steps which I prefer to employ in the reduction of a flat blank to a cylindrical form;

Fig. 4 is a central sectional view of the blank showing it as having been subjected to the next drawing operation and illustrating the plunger in the act of being removed;

Fig. 5 is a sectional view of a set of dies shown in the act of finishing the next step in the operation;

Fig. 6 is a side view of the blank after it has been subjected to another operation similar to that illustrated in Fig. 5;

Fig. 7 is a similar view showing the blank drawn down still further in the same way;

Fig. 8 is a similar view showing the blank reduced at the end in preparation for the next step, the result of which is shown in Fig. 9, which represents the finished product in central section;

Figure 10:
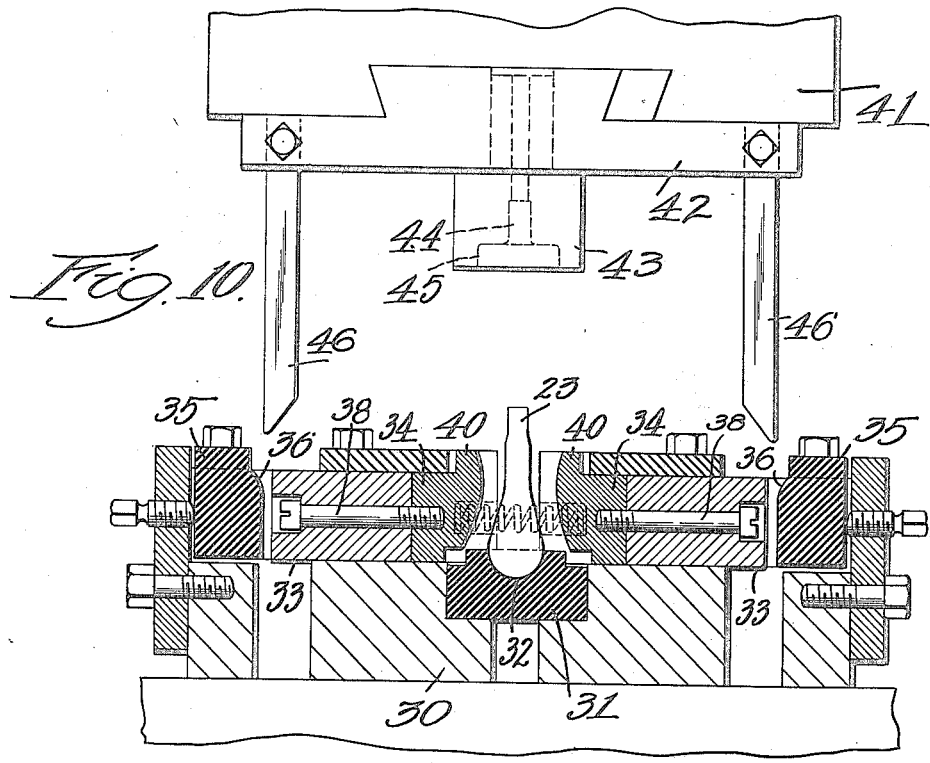
Fig. 10 is a sectional view of a set of dies with the blank illustrated in Fig. 8 therein ready to start operation thereon.

As is well understood in this art, the original flat blank of sheet metal is cut out in circular form and subjected to a plurality of drawing operations, the number of which will depend upon the quality and thickness of the metal used and the character of the result desired. I have shown this series of operations as consisting of three steps illustrated in Figs. 1, 2 and 3. These three steps of the process are common in the art of making sheet metal articles and need not be described in detail.

The blank shown in Fig. 3 is then placed in another die of the same character as that through which it has been passed before and forced through it by means of a plunger 10 shown in Fig. 4. It is to be noted that this plunger is provided with a reduced end 11 and that the blank 12 therefore is provided with a lower cylindrical portion at 13 adjacent to the closed convex end which is of greater thickness than the rest of the blank. This extra thickness extends along the cylindrical wall of the blank for a material distance and is provided for the purpose of securing additional strength in the metal to stand up under the next operation or series of operations.

This operation is shown in Fig. 5. Here the bottom die 14, which preferably is stationary, is provided with a passage open at bottom and top but larger at the top. A reciprocable upper die 16 has a cavity 15 of practically the same shape as that of the end of the finished article and shown in this case as substantially hemispherical, although of course, its shape will depend on the object in view. This is adapted to be carried up and down with a vertically reciprocating motion. The blank 12 is placed in the die 14 so that its open end will be centered in the central enlargement at the top as shown in dotted lines. This die 16 comes down as indicated in Fig. 5 and forces the blank down so as to gradually reduce the cylindrical open end of the blank to produce the shape indicated in full lines in Fig. 5. It is to be observed that the part of the blank which is adjacent to the hemispherical end is drawn into a conical shape and that there is a reduction of the cylindrical part at the open end.

The blank is removed from the die 14 by an upwardly operating ejector 17 located in a cylinder 18 having a central cavity for receiving the end of the blank as it is forced down through the die 14. This is carried by a support 20. It is to enable the blank to stand up against the above described series drawing operation that the blank was thickened up as shown in Fig. 4.

If the stock is thin and soft enough, the operation can be carried out so as to reduce the diameter clear down to the end of the conical surface 19 as shown. I have also shown in Fig. 6, the blank as subjected to another drawing operation similar to that shown in Fig. 5, in dies having a little smaller cavity. I also prefer to repeat this operation with a set of still smaller size dies to produce the blank shown in Fig. 7.

If a handle is to be produced of the shape shown in Fig. 9, I now reduce the diameter of the extreme open end by a simple drawing process to produce the form shown at 23 in Fig. 8. This blank, it is to be observed has a hemispherical closed end 24, a conical section 25 next to it and merging gradually into it and a cylindrical part at 26 connecting the conical part with the reduced end 23.

This blank is then formed into the shape shown in Fig. 9 which is the finished article. For that purpose, I prefer to employ dies like those shown in the last four figures. These involve a die block or support 30 having a fixed die 31 thereon and having a hemispherical cavity 32 in which the blank is supported on end as shown in Fig. 10.

Slidably mounted on this die block or support 30 are a pair of slides 33 each having a die member 34. These two die members are adapted to come together to surround the blank and shape it slightly so as to bring it to its finished accurate form and they also serve to hold it in central position as will appear. The extreme ends of the slides 33 are spaced slightly from stationary blocks 35 which are beveled off at 36. These slides are provided with a plate 37 for holding the die members in position and bolts 38 for clamping them. A pair of springs 39 are employed for yieldingly forcing the dies 34 apart whenever there is no positive means for preventing it and thus opening the dies automatically. The dies have centering projections 40 on top.

The frame for the press is not illustrated but it supports in addition to the parts above described, a head 41 which is adapted to reciprocate vertically in this instance. It has fixed to its lower surface a plate 42 which carries a shaping die 43. This die is provided with a shaping cavity 44 and with a centering cavity 45. This centering cavity is adapted to engage the upward projections 40 on the dies 34 and center them with respect to the die 43 as the latter descends.

Figure 11:
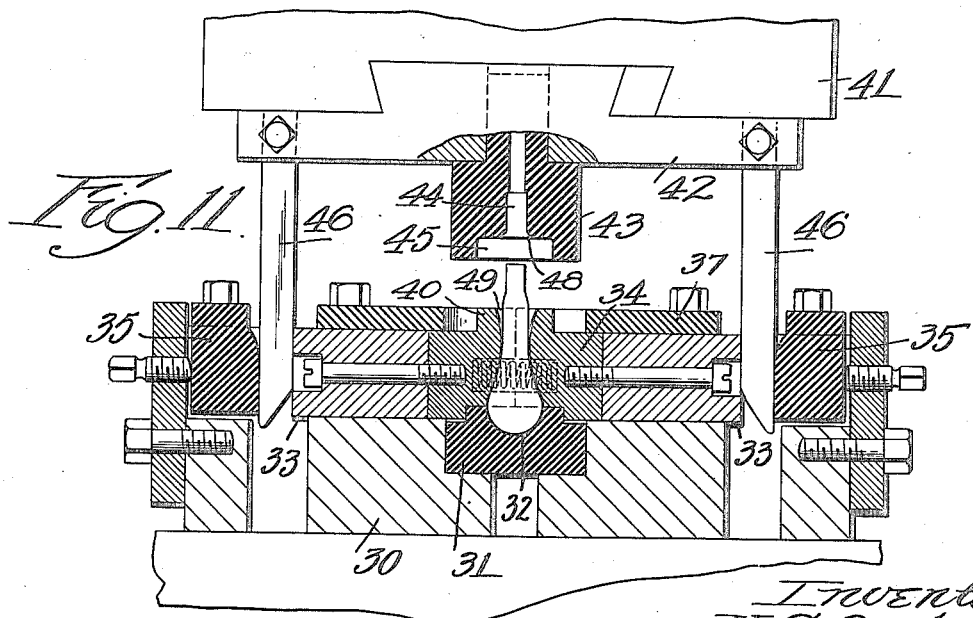
Fig. 11 is a similar view showing the lower dies closed up and the upper die just ready to act.
Figure 12:
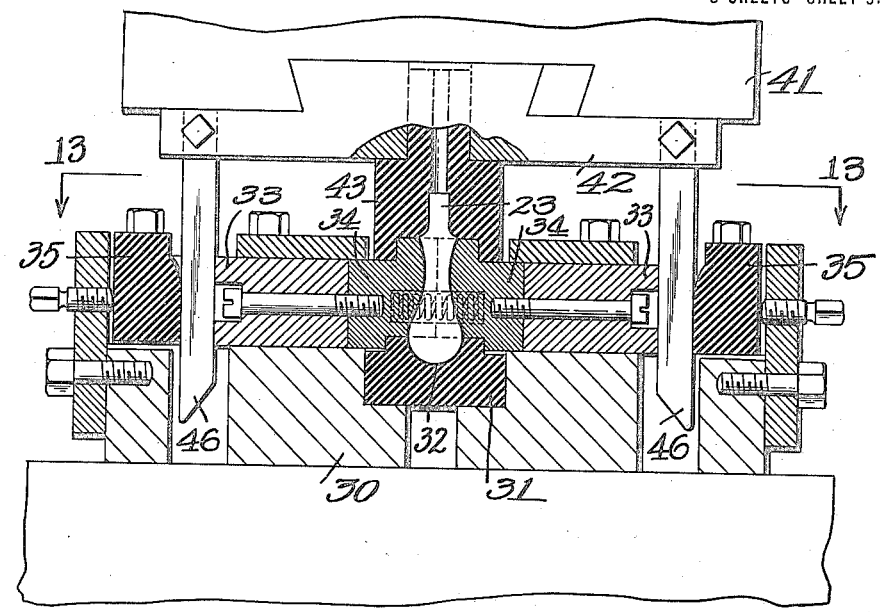
Fig. 12 is a similar view showing the operation completed.
Figure 13:
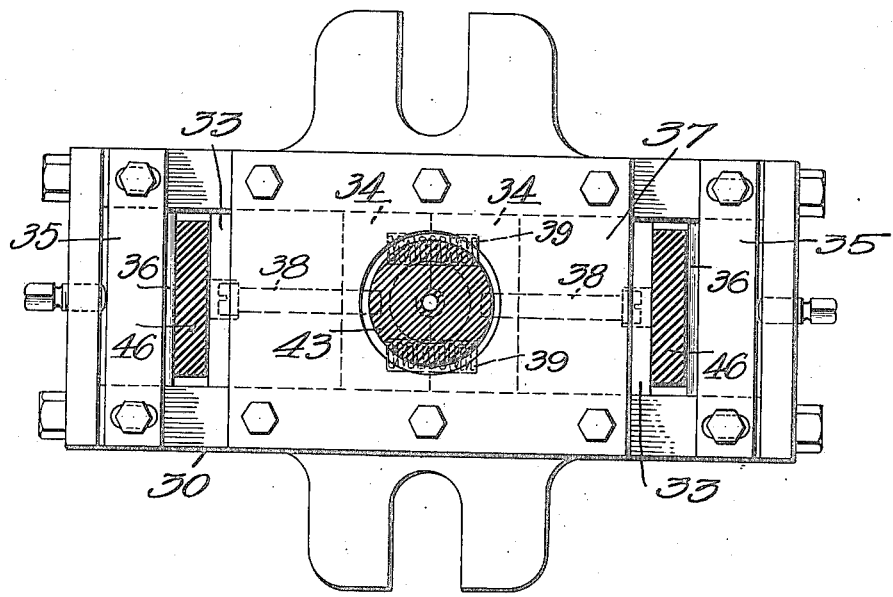
Fig. 13 is a horizontal sectional view on the line 13—13 of Fig. 12.

The operation of the device is shown clearly in Figs. 10, 11 and 12. The operator puts the blank into the lower die 31 so that it stands up therein. It is not necessary to be very careful about placing it so long as the convex end is centered in the cavity 32. The press is then operated to bring the head down, the first effect of which is to cause a pair of wedges 46 carried by the head to enter the spaces between the blocks 35 and the die members 33 as shown in Fig. 11. This forces the dies positively together against the action of the springs 39 which have held them open. This centers the blank automatically and performs a finishing shaping operation to bring the blank down to size and also to smooth up any inaccuracies, these dies being the final finishing dies. As the head descends farther, the walls of the cavity 45 close down over the projections 40 and accurately bring them together and center them.

It is to be observed that the cavity 44 has a flat end wall which engages the end 23 of the blank and pushes the same down, upsetting the metal into a pair of depressions 48 and 49, provided in the dies 43 and 34. These depressions are shaped in the form shown in such a way as to produce a circumferential rib 50 around the blank between the shaft 23 and the neck of the handle as shown in Fig. 9. This upsetting operation thickens and strengthens the metal at these points and finishes the blank so far as the die pressing operations are concerned. It is not necessary to subject it to any further operations except to polish it. The finished article is accurately circular in cross section if that is desired and does not have to be machined. It can be made of any other shape in cross section according to this invention.

It will be seen that the operation shown in Fig. 5 is a severe test for the previous treatment of the metal and that the thickening of the metal at 13 is performed to strengthen it at the point of its largest diameter so that when the body and neck above that are reduced and the shape changed from cylindrical to conical, the metal will not buckle or get out of shape at this point. This is an important feature of the process because it is found in the ordinary practice of sheet metal working that the changing of the shape as just described is a difficult operation to perform and with many kinds of metal, impossible.

By this simple procedure, I have been enabled to produce this desired change without danger of making any undue percentage of imperfect articles. I also find it decidedly advantageous to perform the operation shown in Fig. 5 in at least two steps and not try to draw down the blank shown in Fig. 4 to the condition shown in Fig. 7 by a single operation.

Although the lower closed end of the blank is thickened materially, as shown in Fig. 4, yet when the article is completed, all the metal above is thickened so much by the reduction in diameter and the upsetting operation, that the article exhibits substantially the characteristics illustrated in Fig. 9. The thickness of the metal gradually increases from the closed end to the open end. In this way, great strength is secured where it is needed and unnecessary metal at the closed end is avoided.

Although I have illustrated and described a specific method of procedure, and a certain number of steps to secure the result, I am aware of the fact that changes can be made in the order of the steps and particularly in the number employed for each material change of shape without departing from the scope of the invention as expressed in the claims. Therefore I do not wish to be limited in these respects, but what I do claim is:—

1. A method of producing an article from sheet metal which comprises drawing out a flat blank of sheet metal to a general cylindrical shape having a convex closed end and an open end, thickening the walls of the metal at or near the closed end, and then reducing the diameter of the blank from the thickened portion to the open end by a drawing operation.

2. The method of making an article from sheet metal which comprises drawing a sheet metal blank down to a cylindrical form with a substantially hemispherical closed end having walls thicker than the walls at the open end of the blank, drawing it in dies to reduce the diameter of the cylindrical part, leaving the closed end substantially without change, and shaping the thickened walls into conical form to connect the closed end with the reduced cylindrical part.

3. The method of producing an article from sheet metal which comprises drawing out a flat blank of sheet metal to a general cylindrical shape having a convex closed end and an open end, thickening the walls of the metal at or near the closed end, holding the convex end in a fixed shape, and drawing down the cylindrical part to reduce its diameter by forcing it through a die axially.

4. The method of making an article from sheet metal which consists in reducing a circular blank to a cylindrical form having a convex closed end, thickening the walls of the blank adjacent to said closed end, drawing it in a die to reduce its diameter at the open end, then subjecting it to another similar drawing operation to reduce the cylindrical end further and elongate it and provide a portion of a general conical shape connecting it with the convex end.

5. The method of making an article from sheet metal which consists in reducing a circular blank by succesive drawing operations to a cylindrical form having a convex closed end, thickening the cylindrical walls of the blank adjacent to said closed end, drawing the blank in a die to reduce its diameter at and near the open end and leaving the rest of it in a form to gradually connect the full size convex end to the reduced cylindrical open end, then subjecting it to another similar operation to leave the convex end substantially unchanged and reduce the cylindrical end throughout its length, further reducing the cylindrical portion by a similar operation, and then performing a final reduction at the extreme open end to bring said open end to the final size of the finished article.

6. The method of making an article from sheet metal which consists in reducing a circular blank by successive drawing operations to a cylindrical form having a convex closed end, thickening the walls of the blank adjacent to said closed end, forcing it along a die toward the convex end to reduce its diameter, throughout the length of the cylindrical part and leaving the rest of it in a form to gradually connect the full size convex end to the reduced cylindrical part, then subjecting it to another similar operation to leave the convex end substantially unchanged, reduce the cylindrical end further and elongate it and provide a portion of a general conical shape connecting them, further reducing the cylindrical position by a similar operation, then performing a final reduction at the extreme open end and forming a circumferential rib around the blank at the end of said reduced portion and giving it its finished shape.

7. The method of producing an article from sheet metal which comprises drawing out a flat blank of sheet metal to a general cylindrical shape having a convex closed end and an open end, thickening the walls of the metal throughout an area near the closed end, drawing down the cylindrical part to reduce its diameter by forcing it along a die axially toward the said convex end, holding said blank in dies to center it, and upsetting the open end to thicken its walls and form a circumferential rib around it at a short distance from the open end merging gradually into the walls on both sides of it.

8. The method of producing an article from sheet metal which comprises drawing out a flat blank of sheet metal into a general cylindrical shape having a convex closed end and an open end, thickening the walls of the metal at or near the closed end, then reducing the diameter of the blank from the thickened portion to the open end by drawing operations, thereafter pressing on the blank longitudinally at its open end, and confining the metal so as to cause it form a circumferential rib as it expands under pressure.

9. The method of producing an article from sheet metal which comprises drawing out a flat blank of sheet metal into a general cylindrical shape having a convex closed end and an open end, reducing the diameter of the blank from the open end by drawing operations, thereafter pressing on the blank longitudinally at its open end, and confining the metal so as to cause it to form a circumferential rib as it expands under pressure.

In testimony whereof I have hereunto affixed my signature.

HJALMAR G. CARLSON.